US009199866B2

(12) United States Patent
Al-Samadi

(10) Patent No.: US 9,199,866 B2
(45) Date of Patent: Dec. 1, 2015

(54) HIGH RECOVERY DRINKING WATER PROCESS

(76) Inventor: Riad A. Al-Samadi, Burlington (CA)

(*) Notice: Subject to any disclaimer, the term of this patent is extended or adjusted under 35 U.S.C. 154(b) by 6 days.

(21) Appl. No.: 13/588,272

(22) Filed: Aug. 17, 2012

(65) Prior Publication Data

US 2013/0043190 A1 Feb. 21, 2013

Related U.S. Application Data

(60) Provisional application No. 61/524,554, filed on Aug. 17, 2011.

(51) Int. Cl.

| B01D 21/30 | (2006.01) |
|---|---|
| B01D 15/00 | (2006.01) |
| B01D 15/04 | (2006.01) |
| C02F 1/42 | (2006.01) |
| B01D 61/02 | (2006.01) |

(Continued)

(52) U.S. Cl.
CPC ............... *C02F 1/42* (2013.01); *B01D 61/025* (2013.01); *B01D 61/027* (2013.01); *B01D 61/04* (2013.01); *B01D 65/08* (2013.01); *B01J 39/046* (2013.01); *B01J 41/043* (2013.01); *B01J 45/00* (2013.01); *B01J 49/0008* (2013.01); *B01J 49/0013* (2013.01); *C02F 1/441* (2013.01); *C02F 1/442* (2013.01); *B01D 2311/04* (2013.01); *B01D 2311/08* (2013.01); *B01D 2321/16* (2013.01); *C02F 1/001* (2013.01); *C02F 1/283* (2013.01); *C02F 5/10* (2013.01); *C02F 2001/422* (2013.01); *C02F 2201/005* (2013.01); *C02F 2301/046* (2013.01); *C02F 2303/16* (2013.01); *C02F 2303/185* (2013.01); *C02F 2303/22* (2013.01)

(58) Field of Classification Search
None
See application file for complete search history.

(56) References Cited

U.S. PATENT DOCUMENTS 3,639,231 A 2/1972 Bresler et al.
3,951,802 A * 4/1976 Derouineau ................. 210/134

(Continued)

FOREIGN PATENT DOCUMENTS

| WO | 2009131635 A2 | 10/2009 |
|---|---|---|
| WO | 2011020176 | 2/2011 |
| WO | 2011147019 A1 | 12/2011 |

OTHER PUBLICATIONS

Everest, William R, et al. "groundwater reclamation by innovative desalting in Orange County, California," Desalination, vol. 117, Issues 1-3, Sep. 20, 1998, pp. 197-202.

(Continued)

*Primary Examiner* — Nam Nguyen
*Assistant Examiner* — Richard Gurtowski
(74) *Attorney, Agent, or Firm* — Hodgson Russ LLP

(57) ABSTRACT

Disclosed is a process that uses reverse osmosis (RO) or nanofiltration (NF) membranes and ion exchange (IX) water softening resins to maximize the production of drinking water, purified industrial service water or recycled purified municipal or industrial effluents. The membrane and ion exchange units are configured in a manner that enables operation of the system at high permeate recoveries in the range 90% to 99%, thus producing purified drinking water with a minimum volume of wastewater to drains and a very low membrane cleaning or membrane replacement frequency. The process mitigates membrane fouling and scale formation and minimizes the use of water treatment chemicals including acidic and alkali solutions and sodium chloride salt that is normally required to regenerate the IX resin.

10 Claims, 5 Drawing Sheets

(51) Int. Cl.
- *B01D 61/04* (2006.01)
- *B01D 65/08* (2006.01)
- *C02F 1/44* (2006.01)
- *B01J 39/04* (2006.01)
- *B01J 41/04* (2006.01)
- *B01J 45/00* (2006.01)
- *B01J 49/00* (2006.01)
- *C02F 1/00* (2006.01)
- *C02F 1/28* (2006.01)
- *C02F 5/10* (2006.01)

(56) References Cited

U.S. PATENT DOCUMENTS

| | | | | |
|---|---|---|---|---|
| 4,161,446 A | * | 7/1979 | Coillet | 210/638 |
| 5,925,255 A | * | 7/1999 | Mukhopadhyay | 210/652 |
| 6,113,797 A | | 9/2000 | Al-Samadi | |
| 6,416,668 B1 | | 7/2002 | Al-Samadi | |
| 6,461,514 B1 | | 10/2002 | Al-Samadi | |
| 6,537,456 B2 | | 3/2003 | Mukhopadhyay | |
| 6,607,668 B2 | * | 8/2003 | Rela | 210/321.6 |
| 7,077,962 B2 | | 7/2006 | Pipes | |
| 7,132,052 B2 | | 11/2006 | Rawson et al. | |
| 7,514,001 B2 | | 4/2009 | Costa et al. | |
| 2005/0061741 A1 | * | 3/2005 | Mainz et al. | 210/639 |
| 2005/0139530 A1 | * | 6/2005 | Heiss | 210/85 |

OTHER PUBLICATIONS

Purolite Shallow Shell Technology Strong Acid Cation Product Data Sheet; accessed via: http://www.purolite.com/Customized/CustomizedControls/Products/ProductDSPDF.aspx?ProductID=706&RelID=606273&registered=1 on Jan. 29, 2013.

* cited by examiner

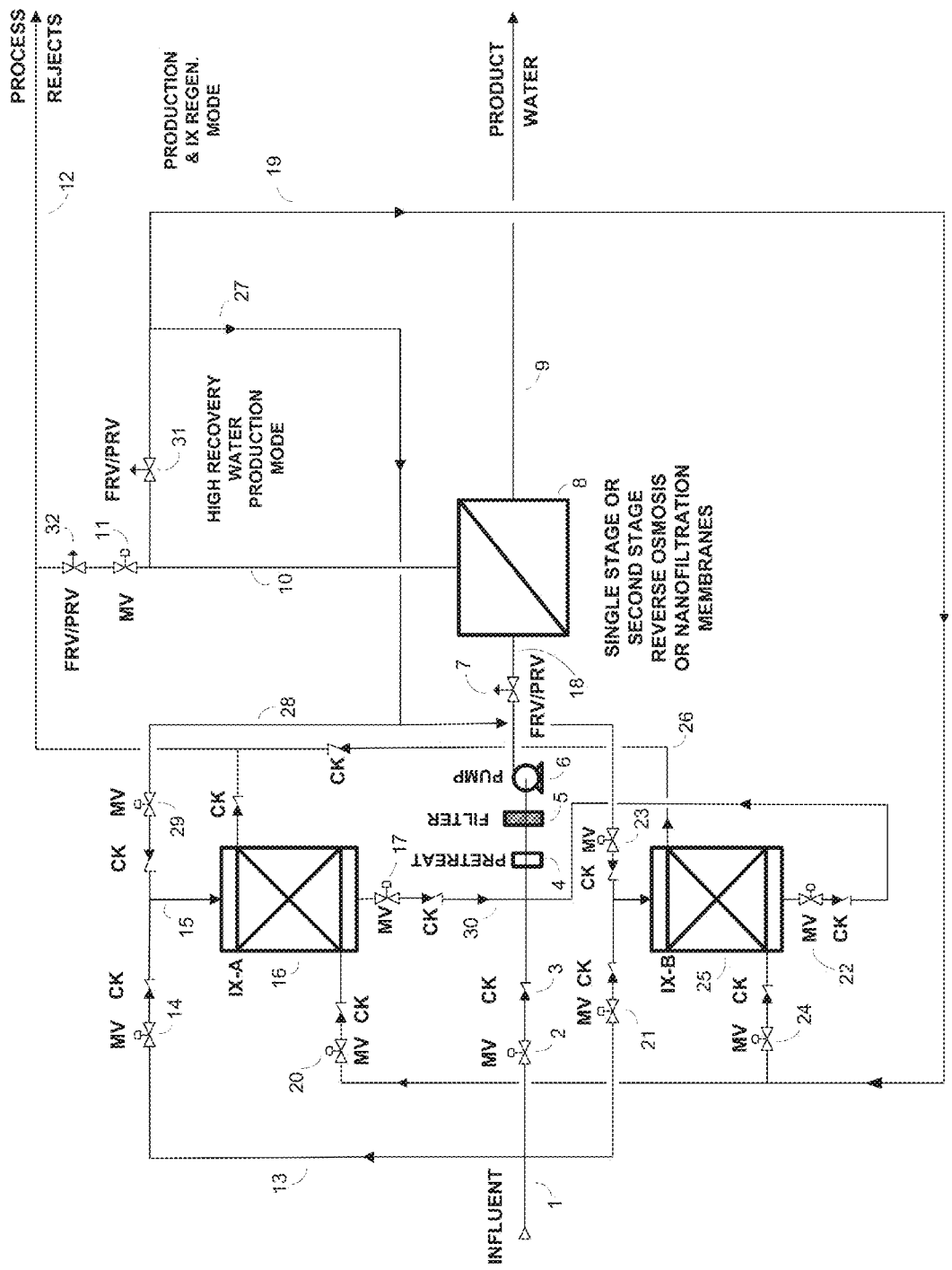

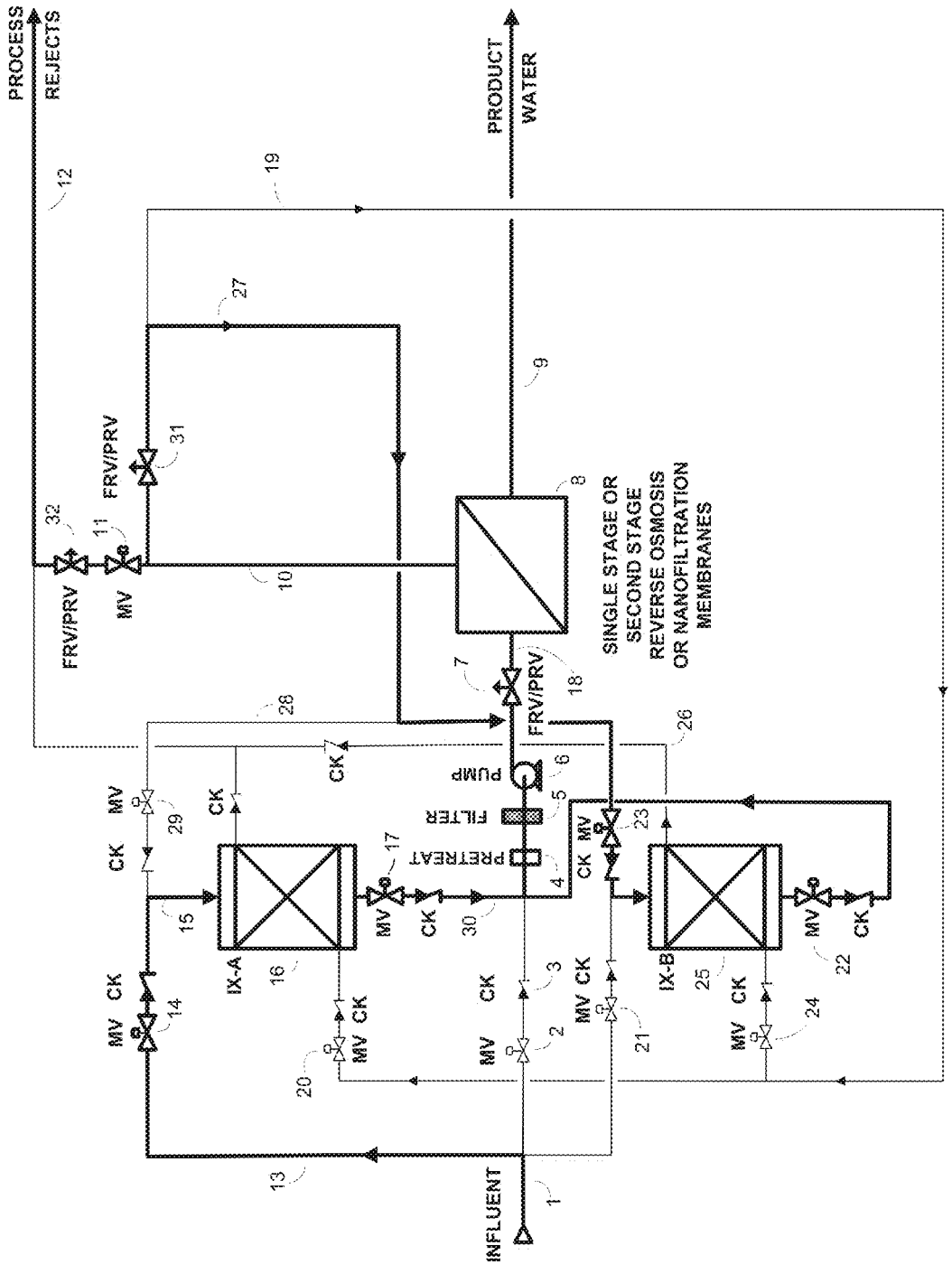

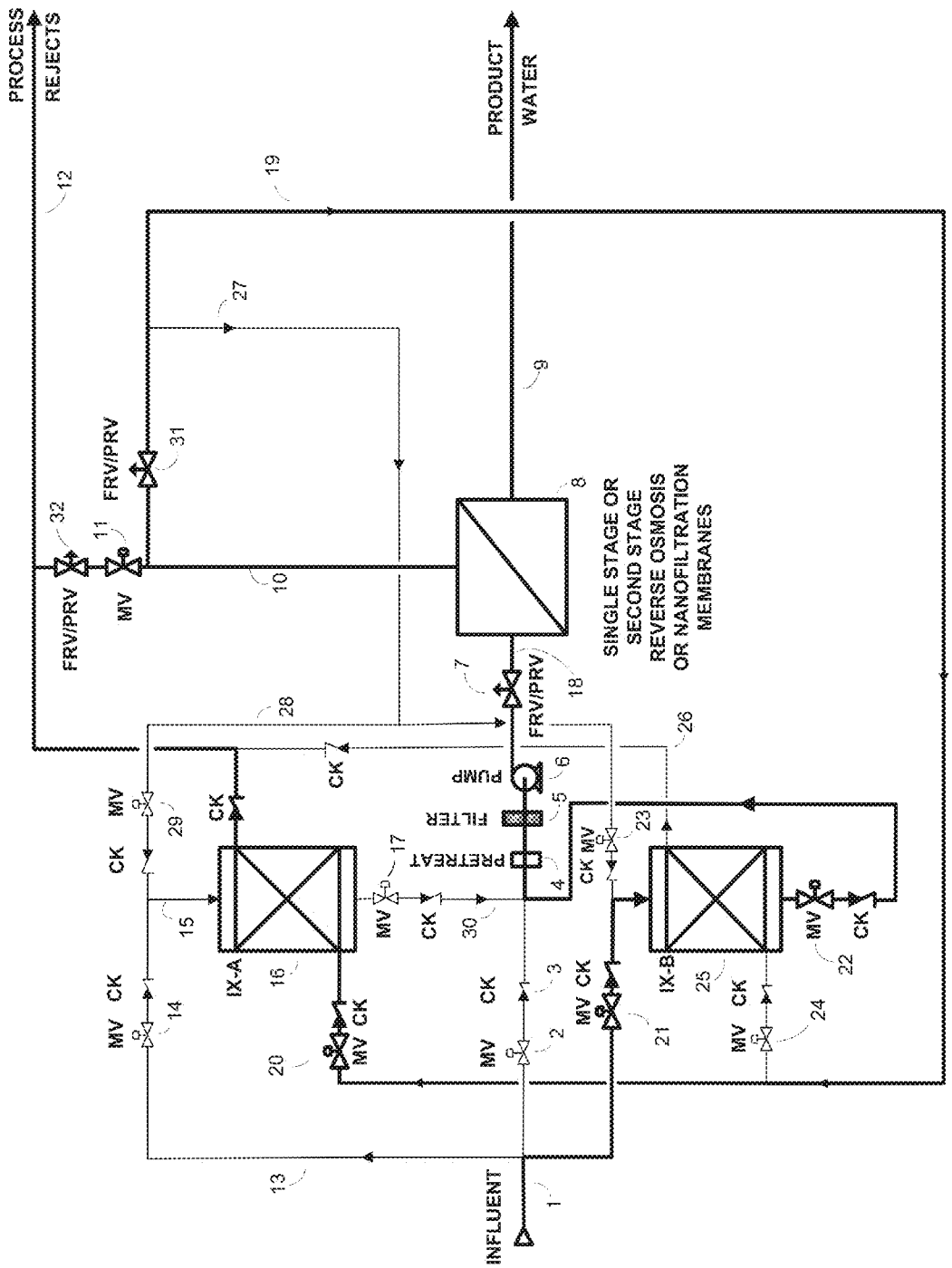

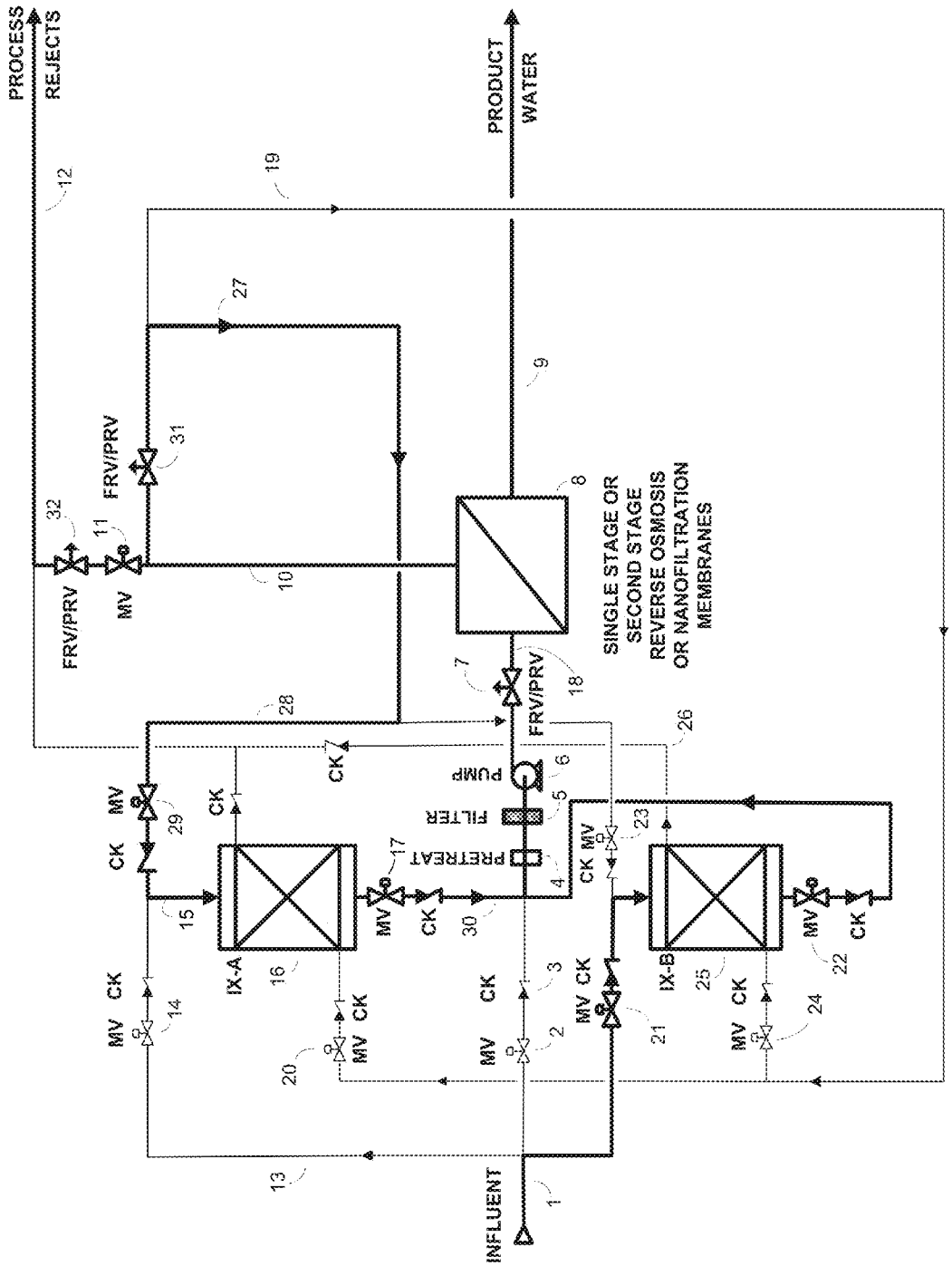

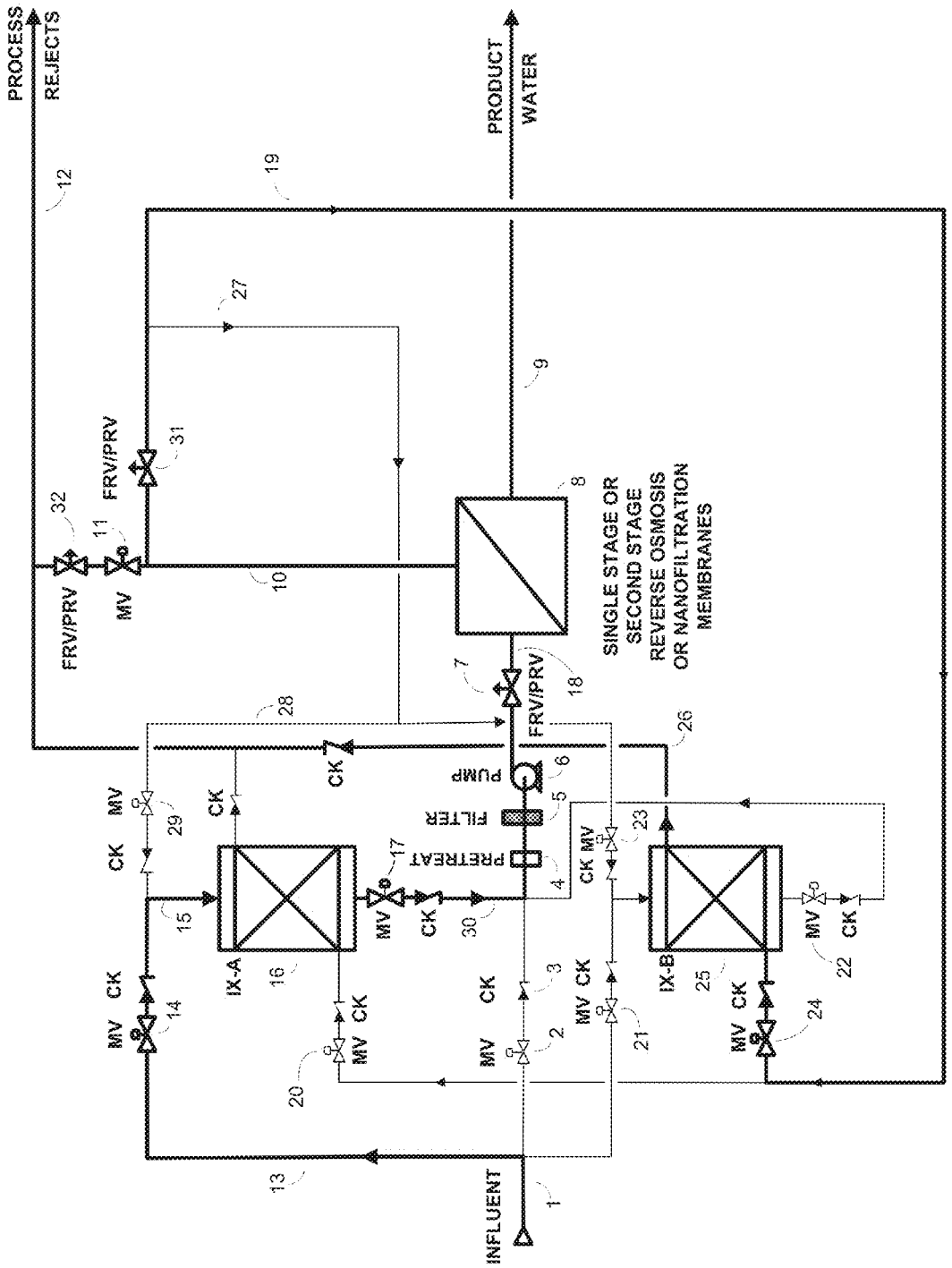

HIGH RECOVERY DRINKING WATER PROCESS

CROSS REFERENCE TO RELATED APPLICATIONS

The present invention claims priority to U.S. Provisional Patent Application No. 61/524,554, filed on Aug. 17, 2011, which is incorporated by reference in its entirety.

FIELD OF THE INVENTION

The present invention relates generally to membrane-based water purification. In particular, the present invention comprises a method, a process and a system design aimed at increasing the efficiency of "Whole House RO" systems used for drinking water purification.

BACKGROUND OF THE INVENTION

Hardness precursors such as barium, calcium, magnesium, iron, silica, carbonate and bi-carbonate, fluoride and sulfate are commonly found in surface water supplies, water wells and aquifers and in aqueous industrial effluents such as cooling tower blow-down. These sparingly soluble contaminants limit the percentage recovery of purified, desalinated permeate from reverse osmosis (RO) and nano-filtration (NF) membranes, as they tend to form scale compounds upon concentration, which deposit on the surface of the membranes and reduce their useful service life or require very frequent membrane cleaning frequencies.

A simple RO membrane system will typically achieve a maximum permeate recovery of approximately 70%. Conventional home type RO systems, also known as Whole House RO systems are typically operated with a permeate recovery of 25% to 50%. At these low permeate recoveries, however, 1-3 gallons of water will be wasted for every gallon of purified or desalinated drinking water that is produced. This low membrane permeate recovery is intended to completely mitigate the risk of build-up of fouling material including natural organic matter, colloidal matter and scale compounds, thereby minimizing maintenance and reducing the frequency of cleaning or replacement of the costly RO membranes. This low membrane permeate recovery also enables the designer to simplify the RO system design by eliminating use of pretreatment chemicals and membrane cleaning chemicals. These advantages are offset, however, by the poor performance of these basic home or "whole House" RO systems since they generate large volumes of wasted RO reject water and use much more influent (e.g. city water or well water) volume than the volume of the purified water actually consumed by the end-user. In this manner, any savings in the cost of the system are offset by the higher cost of influent water and the sewer discharge costs.

Current improvements in the design of these home RO systems include the use of ion exchange softening resins as pretreatment before the RO membranes in some "Whole House" RO systems, to remove the hardness from the influent water, thus enabling the RO membranes to achieve higher permeate recoveries. These improved systems achieve RO permeate recoveries of 60%-70%, but continue to waste 30%-40% of the influent water as RO rejects to drain. Furthermore, the water softener ion exchange resin must be periodically regenerated by using commercial (i.e. sodium chloride) salt solutions of up to 10% strength to ensure effective regeneration and rinsing of the IX resin and recovery of the resin capacity between regeneration cycles. Further still, fresh water or good quality RO permeate must be used to prepare the regenerating salt solution, thus further reducing the net purified water recovery by an additional 2-5%, while wasting a costly chemical product and adversely impacting the environment and human health by releasing sodium and chloride ions to receiving surface water.

In addition to the foregoing description, it is notable that previous efforts to develop suitable RO systems have been concerned with increasing the membrane process product water recovery and addressing the problems associated with use of commercial salt by using RO concentrates to regenerate the SAC IX resins used as pretreatment for the RO, but despite many efforts in this area, these processes remain inefficient. For instance, they have not been able to achieve a membrane system product water recovery in a highly desirable range (viz. >90% and even >95%), while simultaneously reusing the membrane concentrate to regenerate the IX resin, thereby further improving the net product water recovery and eliminating use of commercial salt for regenerating the IX resin. It is also known that the influent water quality, and in particular the total dissolved solids (TDS) and the concentration of hardness and other multivalent cations and silica associated with surface water and more particularly with groundwater, will vary over time, for example over a period of five years. Thus, previous work in the RO field do not address this variability in the influent water quality and the need to have reliable pre-membrane and post-membrane water softening capability to minimize the adverse impact of hardness and other colloidal multi-valent ions on the membrane permeate flux. The present invention meets these and other needs.

SUMMARY OF THE INVENTION

This invention addresses an ongoing and long felt need by providing an improved, economical system and process for the purification of surface water, groundwater, municipal or industrial effluents, producing purified or desalinated drinking water or service water for industry. Said system and process achieves high product water recoveries greater than 90% and even greater than 95% of the volume of the influent water, depending on the influent water TDS, while simultaneously using the membrane concentrate to regenerate the IX resin, thereby obviating the need to use commercial salt.

This invention combines enhanced pretreatment and post-membrane treatment simultaneously to enable control of fouling and scale-forming material, thus facilitating long-term operation of the membrane system with a minimum frequency of membrane cleaning or replacement. In this manner, the invention provides savings in influent water and wastewater disposal costs while also reducing the adverse impact of chemicals on the environment. As a result of the low maintenance and reduced water costs, this invention is ideally suited for use in homes, restaurants, multiple residential and commercial buildings, water bottling plants and food and beverage manufacturing plants. In this regard, the invention provides a drinking water system and a process wherein the membrane permeate recovery is maximized by continuously removing fouling and scale-forming compounds simultaneously from the influent water and from the membrane concentrate, followed by recycling of the low-hardness membrane concentrate and blending with the influent water. The present invention includes a process that uses RO or NF membranes and IX softening resins to maximize the production of drinking water, purified industrial service water or reclaimed purified municipal or industrial effluents. In particular, the invention provides an economically and environmentally efficient process and system that supplies pure drinking water and potable water to homes, condominium buildings, office buildings and commercial and industrial complexes while generating a minimum of waste to drain. This is achieved by mitigating scale formation and continuously using the membrane concentrate or reject stream to regenerate the IX resin. This will minimize or eliminate the use of fresh water and commercial salt that are normally used to regenerate the IX resin in conventional water softeners, thus improving the process economics and reducing its adverse impact on the environment.

It is an object of the invention to use ion exchange water softening resins to remove sparingly soluble hardness cations including calcium and magnesium, barium, iron and aluminum simultaneously from the influent raw water and from the membrane concentrate in a manner that would prevent formation and build-up of scale and other colloidal, fouling material on the surface of the membranes used to purify the water.

It is another object of the invention to treat influent surface water, city water, well-water and brackish water, and produce desalinated purified water with membrane permeate recoveries in the range 90%-99%.

It is yet another object of the invention to produce a membrane concentrate of sufficiently high salinity, with low hardness of <5 mg/L as calcium carbonate and a total dissolved solids (TDS) concentration >1,000 mg/L and to use this membrane concentrate in order to regenerate the water softening ion exchange resin. In this manner, the invention reduces the clean water consumption needed to make-up the salt solution by 1-5% since the membrane concentrate is used directly as is to regenerate the IX resin. Furthermore, by using the membrane concentrate to regenerate the IX resin, it will not be necessary to use large quantities of commercial (sodium chloride) salt, thereby reducing the operating cost associated with producing purified water and mitigating the adverse environmental impact associated with using commercial salt.

It is still another object of the invention to recycle the IX-softened membrane concentrate at a rate that is sufficiently high to prevent formation and deposition of fouling material and scale compounds on the membrane surface while achieving permeate recoveries in the range 90%-99%.

These and other objects of this invention are illustrated by the specification, claims and Figures.

BRIEF DESCRIPTION OF THE DRAWINGS

FIG. 1 illustrates that, by using two IX water softening resin columns in conjunction with the RO or NF membrane system, a scale-inhibitor dosing unit and a multitude of motorized automated shut-off valves, check valves (collectively "control valves") and flow and pressure regulators, it becomes possible to alternate use of each of the two IX resin columns, initially as a pre-membrane water softening system to remove bulk hardness from the influent water and later as a post-membrane water softening system to remove leaked or residual pre-concentrated hardness from the high TDS membrane concentrate. The design also enables operation to produce purified water with high permeate recoveries while simultaneously regenerating the spent IX resin using the membrane concentrate.

FIG. 2 is a schematic presentation of the main embodiment of the High Recovery Drinking Water Process (viz. $IX_A$-RO-$IX_B$, Normal Water Production Cycle, Mode 1) where IX water softening resin $IX_A$ (16) is used to remove bulk hardness from the influent water 1, the membrane system 8 is used to purify the water and produce product water 9 and $IX_B$ (25) is used to remove any residual (pre-concentrated) hardness and other contaminants from the membrane concentrate 27 before recycling and blending with IX-treated influent water to achieve further permeate water recovery.

FIG. 3 is a schematic presentation of the second embodiment of the High Recovery Drinking Water Process (viz. $IX_B$-RO-$IX_{AR}$) that involves simultaneous Water Production and IX resin Regeneration Cycle, Mode 1. In this case, $IX_{AR}$ refers to the $IX_A$ resin column being used in the regeneration mode. Since the active exchange capacity of the influent water softening resin ($IX_A$) is consumed more rapidly than the membrane concentrate softener ($IX_B$), $IX_A$ will be exhausted first, while $IX_B$ will continue to have available water softening capacity. The flow direction is therefore switched so that the influent water 1 is introduced into $IX_B$ (25) first to remove bulk hardness, followed by membrane system purification 8 to produce product water 9. The automatic switch between the two IX resin columns $IX_A$ and $IX_B$ is based on a timer, on water volume processed or based on the hardness of the IX-treated water. Since the active capacity of $IX_A$ resin 16 has been consumed (i.e. $IX_A$ is exhausted), the RO membrane concentrate 19 is directed under pressure or via a surge (brine) tank to the spent $IX_A$ resin column 16 where the deposited hardness is exchanged for monovalent ions in the RO concentrate, thus regenerating the $IX_A$ resin and preparing it for the next Normal Water Production Cycle (Mode 2). If required periodically, the RO concentrate may be augmented by the addition of sodium chloride (commercial salt) to the brine tank (not shown in FIG. 3), aimed at releasing any accumulated hardness ions, thus maintaining the water softening effectiveness of the IX resin.

FIG. 4 is a schematic presentation of the third embodiment of the High Recovery Drinking Water Process (viz. $IX_B$-RO-$IX_A$, Normal Water Production Cycle, Mode 2) where IX water softening resin $IX_B$ (25) continues to remove bulk hardness and other contaminants from the influent water 1 and the membrane system 8 is used to purify the water to produce product water 9. In this mode of operation, the freshly regenerated $IX_A$ resin 16 is used to remove any residual (pre-concentrated) hardness and other contaminants from the membrane concentrate 27, followed by recycling and blending with IX-treated influent water to achieve further permeate water recovery.

FIG. 5 is a schematic presentation of the fourth embodiment of the High Recovery Drinking Water Process (viz. $IX_A$-RO-$IX_{BR}$, Water Production and IX Resin Regeneration Cycle, Mode 2) that involves simultaneous water production and IX resin regeneration, Mode 2. Upon exhaustion of the $IX_B$ resin 25, the influent water 1 is automatically directed back into $IX_A$ resin column 16 to remove bulk hardness, followed by membrane system purification 8 to produce product water 9. Since the active capacity of $IX_B$ resin 25 has been consumed (i.e. exhausted), the RO membrane concentrate 19 is directed under pressure or via a surge (brine) tank to the spent $IX_B$ resin column 25 where the deposited hardness is exchanged for monovalent ions in the RO concentrate, thus regenerating the $IX_B$ resin and preparing it for the next Water Production Cycle (Mode 1).

DETAILED DESCRIPTION OF THE INVENTION

The present invention provides a process, system and apparatus for water purification which is particularly suitable for purification of drinking water, meaning water that is intended for and/or is suitable for consumption by humans. The invention in various embodiments increases the RO or NF permeate recovery, thereby reducing the volume of membrane rejects to drain that are generated and reduces the intake water volume, thereby reducing the annual operating cost of the drinking water system. The invention can also be applied to the treatment, desalination or purification of industrial service water, and the reclamation of industrial and municipal effluents. Thus, the invention is broadly applicable for purification of water from a variety of sources.

The High Recovery Drinking Water Process represented by the current invention is generally illustrated in FIG. 1, which depicts a General High Recovery Drinking Water System/Process, while the flow paths associated with four representative operating cycles or modes of the process are highlighted in bold lines in FIGS. 2 to 5, respectively.

The invention addresses significant limitations associated with prior art "Home" or "Whole House" RO systems and other high recovery membrane processes and provides an efficient and economically viable automated process wherein the membrane permeate recovery is maximized by eliminating use of fresh water and eliminating use of sodium chloride or other chemicals that are normally needed to regenerate the IX resin.

All ranges disclosed herein are inclusive of the upper and lower limits, each integer there between, and each and every sub-range within the broadest range disclosed. Thus, as non-limiting examples, a range of 90%-99% includes 90%-98%, 91%-99%, 92%-99%, 92%-98%, and so forth so that each possible sub-range within and including 90%-99% is encompassed. This applies to all ranges disclosed herein, irrespective of the units of measurement to which the ranges refer. As a non-limiting example, a range of 1-5 mg/L includes 1-4 mg/L, 2-5 mg/L, etc. Further, each numerical value for ranges disclosed herein includes all digits to the first decimal place. Thus, as a non-limiting example, 90% includes 90.1%, 90.2%, 90.3%, etc.

As shown in a general illustration of the invention in FIG. 1, by using two IX water softening resin columns in conjunction with the RO or NF membrane system, a scale-inhibitor dosing unit, a salt-augmentation brine tank (not shown) and a plurality of motorized automated shut-off valves, check valves and flow and pressure regulators, it becomes possible to alternate use of each of the two IX resin columns. The IX resin columns are thus initially used as a pre-membrane water softening system to remove bulk hardness from the influent water and later as a post-membrane water softening system to remove leaked or residual pre-concentrated hardness from the high TDS membrane concentrate. In this manner, it is possible to continuously remove any accumulated pre-concentrated hardness and other multivalent ions that might leak through the pre-softening IX resin.

By incorporating both the pre-membrane softening and post-membrane softening IX resins, the RO or NF membranes are not susceptible to surface fouling and scale formation due to unexpected deterioration in the hardness removal performance of the pre-softening IX resin. The membranes can thus tolerate less than the 100% removal efficiencies of hardness and other multivalent cations without adversely affecting the permeate flux of the RO or NF membranes, since the post-membrane softening resin will remove any "leaked" hardness from the pre-membrane softening resin.

In contrast, previously existing systems require close to 100% hardness removal efficiencies by the IX resin at all times. Furthermore, by operating the two IX resin columns and the RO or NF membrane system in the manner detailed below in the four operating cycles, it would be possible to produce purified drinking water, potable water or industrial service water continuously without interruption, while minimizing the reject volume sent to drain. Furthermore, by operating the IX and membrane systems in this manner, it will be possible to minimize or completely obviate the need to clean the membranes, and reduce the frequency of membrane replacement to once every 5 years compared to once every 3 years in previously available systems.

The High Recovery Drinking Water membrane system can be the first and only membrane stage, or if the influent water has already been processed through an existing RO or NF membrane system, then the membrane system of this invention can be a second stage membrane system that takes the concentrate from the existing first stage and purifies it, thus achieving improved overall process permeate recoveries in the range 90%-99%.

By using the same versatile process design, equipment and components depicted in FIG. 1, the current invention achieves improved membrane permeate recoveries by applying the following four water purification cycles:

$IX_A$-RO-$IX_B$ (Normal Water Production Cycle, Mode 1, FIG. 2)

$IX_B$-RO-$IX_{AR}$ (Water Production and IX Resin Regeneration Cycle, Mode 1, FIG. 3)

$IX_B$-RO-$IX_A$ (Normal Water Production Cycle, Mode 2, FIG. 4)

$IX_A$-RO-$IX_{BR}$ (Water Production and IX Resin Regeneration Cycle, Mode 2, FIG. 5)

In this manner, high net product water recoveries in the range 90%-99% can be achieved continuously, depending on the influent water TDS, while obviating the need to use commercial salt. Instead of using fresh water or membrane permeate to make up the salt solution used as a brine rinse to regenerate the IX resin in prior art, the relatively hardness-free membrane concentrate having TDS >1000 mg/L and normally >2000 mg/L is used, thus reducing the net volume of system rejects. In order to minimize the scale potential due to the silica, high-efficacy scale inhibitors will be injected into the influent water at a suitable low dosage of 1-5 mg/L.

In accordance with this invention, the influent water 1, which might be city water, well water or surface water, is first filtered to remove suspended solids and colloidal matter, followed by treatment through a granular activated carbon (GAC) column to remove free chlorine, when city water is used as influent.

As shown in the schematic drawing of FIG. 2 which represents a main embodiment of the High Recovery Drinking Water Process invention (viz. $IX_A$-RO-$IX_B$, Normal Water Production Cycle, Mode 1), the filtered, dechlorinated influent water 1 is introduced into a water softener $IX_A$ (16) by automatically closing motorized valves MV2 and MV21 and opening MV14. Appropriately placed check-valves in various circuits of the water purification system will prevent the $IX_A$-treated influent water flow from recirculating around the $IX_A$ resin column and will also prevent said $IX_A$-treated influent water from by-passing the membrane system 8 and from flowing upwards through $IX_B$ resin column via MV22. By selecting said Normal Water Production Cycle (Mode 1), the check valves will, by their inherent position, force said $IX_A$-treated influent water via Pump 6 and flow regulating valve 7 through membrane system 8.

The $IX_A$ resin 16 and $IX_B$ resin 25 are selected from a group that includes strong acid cation exchange resins (SAC), weak acid cation exchange resins (WAC) and chelating resins. These IX resins are intended to selectively and efficiently remove hardness and other divalent and multivalent ions from the influent water 1 and from the membrane concentrate 27, respectively. The sparingly soluble cations that are selectively removed by the $IX_A$ and $IX_B$ resins include calcium, magnesium, aluminum, barium, iron and manganese, thus producing pre-treated influent water and post-treated membrane concentrate, respectively, that are almost completely free from these sparingly soluble cations (i.e. hardness <5 mg/L and typically <1 mg/L as calcium carbonate).

After removing bulk hardness and other multivalent ions from the pretreated influent water 1, a small dose of a polymeric anti-scalant solution in the range 1-5 mg/L is added in 4 to mitigate silica scale formation since the solubility of silica varies in the range 100-120 mg/L at neutral pH, depending on the temperature. The pre-conditioned influent water is then filtered through a cartridge filter 5 having a minimum nominal filtration efficiency of 5 microns, in order to remove residual colloidal matter and produce pre-treated influent water 18 with a maximum 15-minute Silt Density Index ($SDI_{15}$) of 5 and a desirable $SDI_{15}$ of 2-3.

The pretreated influent water 30 is blended with $IX_B$-softened, recycled membrane concentrate 27 and introduced as stream 18 into the membrane system 8 to purify the water and produce a desalinated product water 9 that contains a low concentration of soluble, total dissolved solids (TDS), typically <10 mg/L and a membrane concentrate 10 that contains most of the separated soluble ionic and non-ionic species. The membrane system 8 might use reverse osmosis membranes (RO) or nano-filtration membranes (NF).

As indicated earlier, a significant fraction of the membrane concentrate 27, representing a flowrate equivalent to 10%-100% of the flowrate of influent water, is recycled via flow and pressure regulating valve 31 and motorized valve MV 23, through the $IX_B$ resin column 25 wherein said membrane concentrate's accumulated hardness is removed by the resin. The low-hardness membrane concentrate thus produced is blended with $IX_A$-treated influent water 30 and, as explained earlier, the combined low hardness influent 18 is introduced into membrane system 8 to achieve high overall drinking water recovery of 90%-99%. Any leaked hardness or other fouling and scaling compounds from $IX_A$ resin 16 are removed by $IX_B$ and prevented from accumulating and precipitating over the membrane surface. In this manner, it is possible to maintain scale-free and foulant-free membrane surface, maintain high permeate flux and enable operation at permeate recoveries in the range 90%-99% of influent water flowrate, while simultaneously minimizing the membrane cleaning frequency and prolonging the useful membrane service life.

Operation in this manner will also result in a substantially reduced annual operating cost since 90%-99% of the influent water is utilized as product water, thus reducing the cost of purchased water by as much as 30%-40% when compared to prior art whole house RO systems that typically operate at 50%-70% permeate recovery. Furthermore, the cost of effluent disposal and sewer charges are reduced since a reject volume of 1%-10% will need to be disposed of, compared to 30%-50% for prior art whole house RO systems. The actual volume of the membrane reject stream is determined by the maximum achievable system permeate recovery percentage. This is limited by the concentration of silica in the influent water and, if not limiting, it is determined by the osmotic pressure due to soluble ions (i.e. sodium, potassium, chloride, bicarbonate, etc.) as well as the operating temperature and maximum membrane system design pressure.

For example, Table 1 below shows a summary of six test scenarios of a whole house High Recovery single, 4-inch×40-inch RO element Drinking Water prototype obtained during a test period of 10 months. This performance summary shows the dependence of the system's product water recovery and water quality on the operating temperature and pressure, as well as the influent water TDS. The tests in Table 1 were performed using chlorinated Lake Ontario municipal drinking water that has moderate to high total hardness, as influent to the High Recovery Drinking Water Prototype:

TABLE 1

Examples of Present Invention's High Drinking Water Recovery Scenarios

| Test Case No. | 1 | 2 | 3 | 4 | 5 | 6 |
|---|---|---|---|---|---|---|
| Test Date | 11 Dec. 2011 | 29 Jan. 2012 | 09 Jan. 2012 | 19 Feb. 2012 | 12 Mar. 2012 | 13 Aug. 2012 |
| Water Source | City Water | City Water | City Water | City Water | City Water | City Water |
| Influent Water Temperature (° C.) | 10.6 | 7.8 | 10.6 | 8.9 | 9.4 | 21.1 |
| City Water Pressure (psig) | 60 | 48 | 54 | 53 | 47 | 56 |
| RO Pump Discharge Pressure (psig) | 162 | 150 | 153 | 154 | 150 | 125 |
| Influent TDS (mg/L) | 213 | 212.6 | 213 | 215 | 217.9 | 213.3 |
| Concentrate/Reject TDS (mg/L) | 1330 | 2013 | 2399 | 2851 | 4006 | 5278 |
| Product Water TDS (mg/L) | 4.1 | 6.0 | 7.1 | 8.3 | 11.4 | 14.9 |
| Product Flowrate (gpm) | 1.22 | 1.07 | 1.08 | 1.07 | 1.00 | 1.20 |
| Reject Flow (gpm) | 0.206 | 0.112 | 0.0916 | 0.076 | 0.0495 | 0.0423 |
| Product Water Recovery (%) | 85.6% | 90.5% | 92.2% | 93.4% | 95.3% | 96.6% |

Since the pre-membrane softening resin $IX_A$ removes most of the hardness in the influent water, this resin will exhaust before the post-membrane softening or polishing resin, $IX_B$. As used herein, "exhaust" and "exhausted" and "exhaustion" are terms which refer to a condition wherein at least 90% of the ion exchange sites in the resin are unavailable due to association with hardness ions and other multivalent ions, such as calcium, magnesium or iron cations, or combinations of cations. Upon exhaustion, as shown in FIG. 3, the influent flow 1 is switched to $IX_B$ 25 by automatically closing motorized or solenoid activated valves MV 14 and MV 17 and opening valves MV 21 and MV 22, while keeping valve MV 2 closed. In this mode of operation (Water Production and IX Resin Regeneration Cycle, Mode 1), water production is maintained v is IX resin column $IX_B$ 25 and membrane system 8, as shown in FIG. 3. However, by closing valve MV 29 and opening valve MV 20, the membrane concentrate 19 is diverted to flow through the exhausted $IX_A$ resin column 16 and out to drain or disposal via the process rejects stream 12. In this manner, the exhausted $IX_A$ resin is regenerated by using the high salinity low-hardness membrane concentrate 19, instead of using brine that is prepared from fresh water and commercial salt, thereby maximizing the percentage of net recovered membrane permeate, while simultaneously reducing or eliminating salt use.

The line pressure in the pressurized membrane concentrate stream 19 is used to drive the membrane concentrate flow through $IX_A$ to effect regeneration of the $IX_A$ resin. Alternatively, a surge tank or brine tank and a pressurizing pump (not shown in FIG. 3) can be used to collect the membrane concentrate 19, and periodically enhance its strength by adding a small amount of commercial salt to the concentrate brine tank, if required, to release any accumulated hardness ions, thus maintaining the water softening effectiveness of the IX resin. This IX resin regeneration process may take approximately 30 minutes. Once regenerated, operation of the system is switched to Mode 2 (Normal Water Production Cycle, Mode 2), as shown in FIG. 4, by closing MV20 and opening MV29 and MV17, with $IX_A$ now acting as a hardness polishing unit or post-membrane concentrate softening unit. This automated high recovery mode is continued until the resin in $IX_B$ 25 becomes exhausted. Switching between the different operating modes is preferably based on a water volume totalizer signal, a timer or both. Alternatively, the switch between IX resin columns can be based on the IX-softened water's on-line hardness analyzer signal.

Upon exhaustion of the ion exchange water softening resin in $IX_B$, as shown in FIG. 5, the influent flow 1 is switched back to $IX_A$ 16 by automatically closing motorized or solenoid activated valves MV21 and MV22 and opening valves MV14 and MV17, while keeping valve MV2 closed. In this mode of operation (Water Production and IX Resin Regeneration Cycle, Mode 2), water production is maintained via IX resin column $IX_A$ 16 and membrane system 8, as shown in FIG. 5. However, by closing valve MV29 and opening valve MV24, the membrane concentrate 19 is diverted to flow through the exhausted $IX_B$ resin column 25 and out to drain or disposal via the process rejects stream 12.

In this manner, $IX_B$ resin is regenerated by using the high salinity low-hardness membrane concentrate 19, instead of using a brine solution that is prepared from fresh water and commercial salt, thereby maximizing the percentage of net recovered membrane permeate, while simultaneously reducing or eliminating salt use. This process may take approximately 30 minutes. Once regenerated, operation of the system is switched back to the Normal Water Production Cycle, Mode 1, as shown in FIG. 2, by closing MV24 and opening MV23 and MV22, with $IX_B$ now acting as a hardness polishing unit or post-membrane concentrate softening unit. This automated high recovery mode is continued until the resin in $IX_A$ 16 becomes exhausted, at which point the remaining three operating cycles are repeated, as described earlier.

It is seen from the above that the current invention teaches an efficient and an economical system and a process to produce drinking water, potable water or industrial service water. The process employs an RO or NF membrane system and two IX water softeners, influent water preconditioning and prefiltration and a multitude of automated shut-off valves and check valves that enable continuous automated operation of the system in four sequential cycles. These cycles include pre-softening with IX, RO or NF membrane purification, post-softening/multivalent polishing with IX and automated regeneration of the IX resin using the membrane concentrate, thereby achieving purified water recovery in the range 90%-99% of the influent water flowrate, while minimizing membrane cleaning or replacement and also eliminating or substantially reducing commercial salt use and its concomitant adverse impact on the environmental and human health.

While the invention has been described in terms of preferred embodiments, the claims appended hereto are intended to encompass other embodiments that fall within the spirit of the invention.

What is claimed is:

1. A High Recovery Drinking Water Process that treats influent water and produces reverse osmosis membrane permeate recoveries in the range 90%-99% of an influent water volume, comprising:

providing a High Recovery Drinking Water System comprising:
a) a reverse osmosis (RO) membrane system used to purify influent water and produce membrane permeate product water and membrane concentrate;
b) two ion exchange (IX) water softening resin columns, each connected to said RO membrane system and configured to both provide low-hardness influent water to said RO membrane system and receive said membrane concentrate from said RO membrane system to produce recycled low-hardness membrane concentrate;
c) an anti-scalant metering unit or silica sequestering unit to prevent silica scale formation;
d) a cartridge filter with a maximum nominal filter porosity of 5 microns;
e) one or more pressurizing pumps used to pressurize and transfer said influent water to said RO membrane system and to said two IX water softening resin columns;
f) a brine tank to collect said membrane concentrate and augment ionic strength of said membrane concentrate via salt addition; and
g) control valves selected from the group consisting of automated motorized valves, solenoid valves, air-operated shut-off valves, and combinations thereof, wherein the control valves are opened and closed automatically in a predetermined sequence, and wherein said control valves are configured to enable flow streams that alternate which of said two IX water softening resin columns is a first pre-membrane ion exchange (IX) water softening resin column to remove bulk hardness and other multivalent cations from said influent water;

opening and closing the control valves in a manner and with a timed sequence of operations as to provide a pre-membrane influent water IX softening, RO purification and post-membrane recycled membrane concentrate IX hardness polishing (IXA-RO-IXB process), designated as Normal Water Production Cycle (Mode 1), comprising:

introducing said influent water into one of the two IX water softening resin columns, IXA, to remove hardness and other multivalent cations and produce said low-hardness influent water with a total hardness <5 mg/L as calcium carbonate, wherein said influent water is pre-filtered and dechlorinated;

blending said low-hardness influent water with said recycled low-hardness membrane concentrate to produce a blended low-hardness influent water;

pretreating said blended low-hardness influent water by adding anti-scalant or by passage through said silica sequestering unit, and by filtration through said cartridge filter to produce a pretreated blended low-hardness influent water with Silt Density Index SDI15<5;

pressurizing and introducing said pretreated blended low-hardness influent water into said RO membrane system to purify said pretreated blended low-hardness influent water and produce said membrane product water and said membrane concentrate recovering said membrane permeate product water at a rate in a range 90%-99% of a rate of said influent water;

removing and disposing of a membrane process reject stream from said membrane concentrate at a rate in a range 1%-10% of the rate of said influent water;

introducing said membrane concentrate having a total dissolved solids concentration (TDS) >1,000 mg/L under its own pressure at a rate of 10%-100% of the rate of said influent water into a second of the two IX water softening resin columns, IXB, to produce said recycled low-hardness membrane concentrate with a total hardness <5 mg/L as calcium carbonate; and continuing to operate said High Recovery Drinking Water System in said Normal Water Production Cycle (Mode 1) for a period of time until the IX water softening resin column, IXA, is exhausted;

opening and closing the control valves in a manner and with a timed sequence of operations as to provide a pre-membrane influent water IX softening, RO purification and exhausted IX resin (IXA) regeneration using the membrane concentrate (IXB-RO-IXAR process), designated as Water Production and IX Resin Regeneration Cycle (Mode 1), comprising:

introducing said influent water into the IX water softening resin column, IXB, to remove hardness and other multivalent cations and produce said low-hardness influent water with a total hardness <5 mg/L as calcium carbonate, wherein said influent water is pre-filtered and dechlorinated;

pretreating said low-hardness influent water by adding anti-scalant or by passage through said silica sequestering unit, and by filtration through said cartridge filter to produce said pretreated low-hardness influent water with Silt Density Index SDI15<5;

pressurizing and introducing said pretreated low-hardness influent into said RO membrane system to purify said pretreated low-hardness influent water and produce said membrane permeate product water and said membrane concentrate recovering said membrane permeate product water at a rate in a range 90%-99% of a rate of said influent water;

simultaneously regenerating said exhausted IX resin (IXA) by introducing said membrane concentrate having a total dissolved solids concentration (TDS) >1,000 mg/L under its own pressure or via said brine tank and said pressurizing pump, into said exhausted IX resin (IXA) at a sufficiently high flow-rate and sufficiently high TDS to effect complete removal of hardness and other multivalent ions from said exhausted IX resin (IXA), regenerate said exhausted IX resin (IXA), and produce a volume of spent IX-regenerant waste;

removing said spent IX-regenerant waste from said exhausted IX resin (IXA), combining said spent IX-regenerant waste with a fraction of said membrane concentrate to produce said membrane process reject stream at a rate in a range 1%-10% of the rate of said influent water, and disposing of said membrane process reject stream; and continuing to operate said High Recovery Drinking Water System in said Water Production and IX Regeneration Cycle (Mode 1) until said exhausted IX resin (IXA), is regenerated, producing regenerated IX resin (IXA), and thereby preparing said regenerated IX resin (IXA) for a Normal Water Production Cycle (Mode 2)

opening and closing the control valves in a manner and with a timed sequence of operations as to provide a pre-membrane influent water IX softening, RO purification and post-membrane recycled membrane concentrate IX hardness polishing (IXB-RO-IXA process), designated as the Normal Water Production Cycle (Mode 2), comprising:

introducing said influent water into the IX water softening resin column, IXB, to remove hardness and/or other multivalent cations and produce said low-hardness influent water with a total hardness <5 mg/L as calcium carbonate, wherein said influent water is pre-filtered and dechlorinated;

blending said low-hardness influent water with said recycled low-hardness membrane concentrate to produce a blended low-hardness influent water;

pretreating said blended low-hardness influent water by adding anti-scalant or by passage through said silica sequestering unit, and by filtration through said cartridge filter to produce a pretreated blended low-hardness influent water with Silt Density Index SDI15<5;

pressurizing and introducing said pretreated blended low-hardness influent water into said RO membrane system to purify said pretreated blended low-hardness influent water and produce said membrane permeate product water and said membrane concentrate recovering said membrane permeate product water at a rate in a range 90%-99% of a rate of said influent water;

removing and disposing of a membrane process reject stream from said membrane concentrate at a rate in a range 1%-10% of the rate of said influent water;

introducing said membrane concentrate having a total dissolved solids concentration (TDS) >1,000 mg/L under its own pressure at a rate of 10%-100% of the rate of said influent water, into the IX water softening resin column, IXA, to produce said recycled low-hardness membrane concentrate; and continuing to operate in said Normal Water Production Cycle (Mode 2) for a period of time until the IX water softening resin column, IXB, is exhausted; and opening and closing the control valves in a manner and with a timed sequence of operations as to provide a pre-membrane influent water IX softening, RO purification and exhausted IX resin (IXB) regeneration the membrane concentrate (IXA-RO-IXBR process), designated as Water Production and IX Resin Regeneration Cycle (Mode 2), comprising:

introducing said influent water into the IX water softening resin column, IXA, to remove hardness and other multivalent cations and produce said low-hardness influent water with a total hardness <5 mg/L as calcium carbonate, wherein said influent water is pre-filtered and dechlorinated;

pretreating said low-hardness influent water by adding anti-scalant or by passage through said silica sequestering unit and by filtration through said cartridge filter to produce said pretreated low-hardness influent water with Silt Density Index SDI15<5;

pressurizing and introducing said pretreated low-hardness influent water into said RO membrane system to purify said pretreated low-hardness influent water and produce said membrane permeate product water and said membrane concentrate;

recovering said membrane permeate product water at a rate in a range 90%-99% of a rate of said influent water simultaneously regenerating said exhausted IX resin (IXB) by introducing said membrane concentrate having a total dissolved solids concentration (TDS) >1,000 mg/L under its own pressure or via said brine tank and said pressurizing pump, into said exhausted IX resin (IXB) at a sufficiently high flow-rate and sufficiently high TDS to effect complete removal of hardness and other multivalent ions from said exhausted IX resin (IXB), regenerate said exhausted IX resin (IXB), and produce a small volume of spent IX-regenerant waste;

removing said spent IX-regenerant waste from said exhausted IX resin (IXB), combining said spent IX-regenerant waste with a fraction of said membrane concentrate to produce said membrane process reject stream at a rate in a range 1%-10% of the rate of said influent water, and disposing of said membrane process reject stream; and continuing to operate said High Recovery Drinking Water System in said Water Production and IX Resin Regeneration Cycle (Mode 2) for a period of time until said exhausted IX resin (IXB) is regenerated, producing regenerated IX resin (IXB), and thereby preparing said regenerated IX resin (IXB) for a Normal Water Production Cycle (Mode 1).

2. The High Recovery Drinking Water Process in accordance with claim 1 where the RO membrane system comprises nanofiltration membranes.

3. The High Recovery Drinking Water Process in accordance with claim 1 where the two IX water softening resin columns comprise a sodium-form strong acid cation exchange resin (SAC), weak acid cation exchange resin (WAC) or chelating ion exchange resin.

4. The High Recovery Drinking Water Process in accordance with claim 1 where the two IX water softening resin columns are configured for co-current regeneration or counter-current regeneration.

5. The High Recovery Drinking Water Process in accordance with claim 1 where an ion exchange resin in said two IX water softening resin columns is gel-type, macro-porous, conventional resin or shallow shell resin.

6. The High Recovery Drinking Water Process in accordance with claim 1 where a total dissolved solids concentration of the membrane concentrate is increased up to 10% by the addition of sodium chloride salt or potassium chloride salt.

7. The High Recovery Drinking Water Process in accordance with claim 1 where the influent water is a concentrate stream originating from an existing reverse osmosis or nanofiltration process.

8. The High Recovery Drinking Water Process in accordance with claim 1 where the influent water is a surface water, groundwater, city water, secondary or tertiary effluent from municipal wastewater treatment plants or from industrial wastewater treatment plants, or wastewater that has been treated by a membrane-biological reactor system (MBR).

9. The High Recovery Drinking Water Process in accordance with claim 1 where said exhausted IX resin (IXA), is regenerated based on a timer logic, or based on the totalized volume of water processed by said exhausted IX resin (IXA), or based on on-line water quality monitoring of said low-hardness influent water or based on a combination of these methods.

10. The High Recovery Drinking Water Process in accordance with claim 1 where said exhausted IX resin (IXB), is regenerated based on a timer logic, or based on the totalized volume of water processed by said exhausted IX resin (IXB), or based on on-line water quality monitoring of said low-hardness influent water or based on a combination of these methods.

* * * * *